(12) United States Patent
Wiener et al.

(10) Patent No.: US 11,645,367 B2
(45) Date of Patent: May 9, 2023

(54) DIGITAL WATERMARKING SYSTEM AND METHOD

(71) Applicant: BMJ Group, Inc., Feasterville-Trevose, PA (US)

(72) Inventors: Michael Wiener, Dresher, PA (US); Adam Mellor, Nottingham (GB)

(73) Assignee: BMJ Group, Inc., Feasterville-Trevose, PA (US)

( * ) Notice: Subject to any disclaimer, the term of this patent is extended or adjusted under 35 U.S.C. 154(b) by 388 days.

(21) Appl. No.: 16/677,223

(22) Filed: Nov. 7, 2019

(65) Prior Publication Data

US 2021/0141872 A1 May 13, 2021

(51) Int. Cl.
*G06F 21/10* (2013.01)
*H04N 21/8358* (2011.01)
*G06T 1/00* (2006.01)

(52) U.S. Cl.
CPC .............. *G06F 21/10* (2013.01); *G06T 1/005* (2013.01); *H04N 21/8358* (2013.01); *H04L 2463/101* (2013.01); *H04N 2201/3233* (2013.01)

(58) Field of Classification Search
CPC . G06F 21/10; G06F 2221/0733; G06T 1/005; G06T 11/60; H04N 21/8358; H04N 2201/3233; H04N 5/913; H04N 2005/91335; H04L 2463/101
See application file for complete search history.

(56) References Cited

U.S. PATENT DOCUMENTS

2018/0342038 A1\* 11/2018 Majoros ............. H04N 1/32267

OTHER PUBLICATIONS

Bong et al, Geometric CAD Watermarking System using Line, Arc, Circle Components in Architectural Design Drawings, Dec. 2007, Journal of Korea Multimedia Society, vol. 10, No. 12 (Year: 2007).\*

\* cited by examiner

*Primary Examiner* — Mohammad W Reza
(74) *Attorney, Agent, or Firm* — Massina Pat. & TM Law, PLLC

(57) ABSTRACT

A computer implemented method and a system configured to receive digital content; draw the digital content onto a drawing board; draw a watermark on the drawing board over the digital content, the watermark comprising a series of non-linear lines with the lines having random spacing therebetween in the x and y axes, and save the content of the drawing board in a desired file format.

20 Claims, 3 Drawing Sheets

DIGITAL WATERMARKING SYSTEM AND METHOD

FIELD

This disclosure relates generally to systems and methods for protecting digital and physical content. In particular, this disclosure relates to systems and methods for protecting digital and physical content using digital watermarks which overlie the digital and physical content.

BACKGROUND

Many types of information and content are now stored digitally, including books, music, movies, software programs, video games, databases, advertisements, as well as other content. Because such content is stored digitally, it can be posted and transferred easily using many types of electronic networks. Both private and public electronic networks, including the internet, are frequently used to transfer the digital content.

But the digitization of content has also presented content providers, whether publishers or owners, with challenging problems. Digital content is often easy to copy and easy to distribute after it is posted.

Current attempts at controlling the unauthorized copying and distribution of digital content include the use of digital watermarks. Digital watermarking is the process of altering the original data file by adding hidden data or information (i.e., copyright notices or verification messages) to the digital content without the user's knowledge. Such hidden data often contains information pertaining to the digital content or to the author of the digital content that can be used to either restrict the use of the digital content or as a mechanism to track the use of the digital content. Anyone with knowledge of the watermark and how it can be recovered can determine to some extent whether or not significant changes occurred to the digital content. With digital watermarks, the digital content cannot be typically altered without sacrificing the quality or utility of the digital content itself.

However, in some contexts it is desirable that the watermark remain visible on both the digital copy and any physical copies made thereof. For example, various regulations require online retailers to post a certification as to quality, authenticity or the like for their products. Such certifications are subject to digital or physical copying and modification. A second retailer can copy and modify an original retailer's certification to give the appearance that the second retailer's products have also been certified, circumventing the certification requirements. Other digital content, for example, financial documents, could also be subject to such fraudulent copying and modification.

Accordingly, there is a need for a digital watermarking process which provides a watermark on digital content which is difficult to remove, whether through digital or physical copying.

SUMMARY

In at least one embodiment, the present disclosure provides a non-transitory computer readable storage medium including executable instructions that, when executed by a processor, cause the processor to: receive digital content; draw the digital content onto a drawing board; draw a watermark on the drawing board over the digital content, the watermark comprising a series of non-linear lines with the lines having random spacing therebetween in the x and y axes, and save the content of the drawing board in a desired file format.

In at least one embodiment, the disclosure provides a computer implemented method of processing digital content, the computer implemented method comprising: receiving digital content; drawing the digital content onto a drawing board; drawing a watermark on the drawing board over the digital content, the watermark comprising a series of non-linear lines with the lines having random spacing therebetween in the x and y axes, and saving the content of the drawing board in a desired file format.

BRIEF DESCRIPTION OF THE DRAWINGS

The accompanying drawings, which are incorporated herein and constitute part of this specification, illustrate the presently preferred embodiments of the disclosure, and, together with the general description given above and the detailed description given below, serve to explain the features of the disclosure. In the drawings.

DETAILED DESCRIPTION

Figure 1:
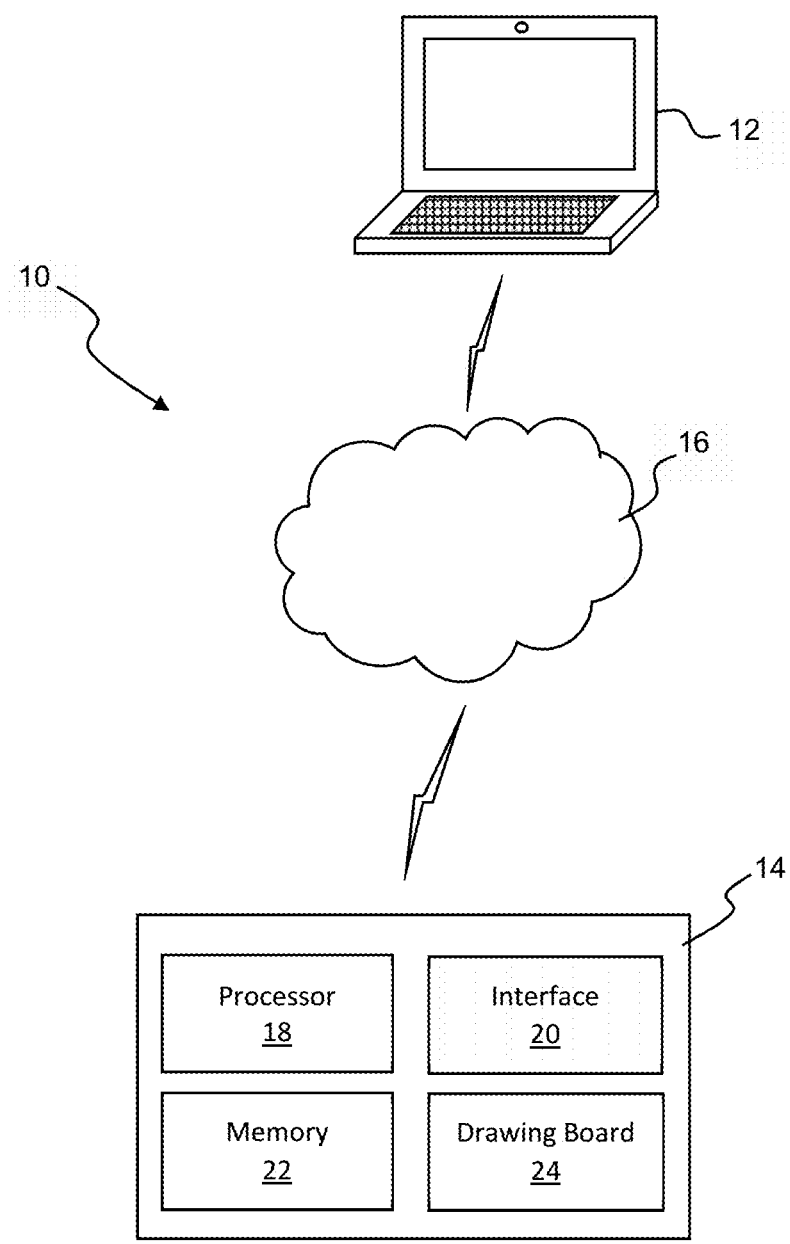
FIG. 1 is a schematic drawing of the watermarking system in accordance with an embodiment of the disclosure.

In the drawings, like numerals indicate like elements throughout. Certain terminology is used herein for convenience only and is not to be taken as a limitation on the present disclosure. The following describes preferred embodiments of the present disclosure. However, it should be understood, based on this disclosure, that the disclosure is not limited by the preferred embodiments described herein.

It should be noted that the description merely illustrates the principles of the present subject matter. It will thus be appreciated that those skilled in the art will be able to devise various arrangements that, although not explicitly described herein, embody the principles of the present subject matter and are included within its spirit and scope. Furthermore, all examples recited herein are principally intended expressly to be only for pedagogical purposes to aid the reader in understanding the principles of the present subject matter and the concepts contributed by the inventors to furthering the art, and are to be construed as being without limitation to such specifically recited examples and conditions. Moreover, all statements herein reciting principles, aspects, and embodiments of the present subject matter, as well as specific examples thereof, are intended to encompass equivalents thereof.

It will also be appreciated by those skilled in the art that the words during, while, and when as used herein are not exact terms that mean an action takes place instantly upon an initiating action but that there may be some small but reasonable delay, such as a propagation delay, between the initial action and the reaction that is initiated by the initial action.

Additionally, the word "connected" is used throughout for clarity of the description and can include either a direct connection or an indirect connection.

While aspects of described systems and methods for digital watermarking can be implemented in any number of different computing devices, environments, and/or configurations, the embodiments are described in the context of the following exemplary systems.

FIG. 1 illustrates a watermarking system 10 according to an embodiment of the present subject matter. The watermarking system 10 includes one or more terminals 12 and a watermarking unit 14. The terminal 12 and the watermarking unit 14 may be part of the same physical device or they may be connected to through a network 16. The network 16 may be a wireless network, wired network, or a combination thereof. The network 16 can be implemented as one of the different types of networks, such as intranet, telecom network, electrical network, local area network (LAN), wide area network (WAN), Virtual Private Network (VPN), internetwork, Global Area Network (GAN), the Internet, and such. The network 16 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the network 16 may include a variety of network devices, including routers, bridges, servers, computing devices, storage devices.

The terminal(s) 12 and the watermarking unit 14 can be implemented as any of a variety of conventional computing devices including, for example, servers, a desktop PC, a notebook or a portable computer, a workstation, a mainframe computer, a mobile computing device, an entertainment device, and an Internet appliance. Although the terminal 12 and the watermarking unit 14 are shown to be connected through a physical network 16, it would be appreciated by those skilled in the art that the terminal 12 and the watermarking unit 14 may be distributed locally or across one or more geographic locations and can be physically or logically connected to each other.

The watermarking unit 14 may be coupled to the terminals 12 for various purposes. For example, the watermarking unit 14 may be connected to a terminal 12 to receive digital content in order to watermark the received digital content and distribute the watermarked digital content to one or more other terminals 12. The implementation and functioning of the watermarking unit 14 to overlay the watermark is as described below.

In one implementation, the watermarking unit 14 includes one or more processor(s) 18, interface(s) 20, a drawing board 22, and a memory 24, and, all coupled to the processor(s) 18. The processor(s) 18 can be a single processing unit or a number of units, all of which could include multiple computing units. The processor(s) 18 may be implemented as one or more microprocessors, microcomputers, microcontrollers, digital signal processors, central processing units, state machines, logic circuitries, and/or any devices that manipulate signals based on operational instructions. Among other capabilities, the processor(s) 18 is configured to fetch and execute computer-readable instructions and data stored in the memory 24.

The functions of the various elements shown in the figure, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other hardware, conventional, and/or custom, may also be included.

The interface(s) 20 may include a variety of software and hardware interfaces, for example, interfaces for peripheral device(s), such as a keyboard, a mouse, an external memory, a scanner, a camera and a printer. The interface(s) 20 can facilitate multiple communications within a wide variety of networks and protocol types, including wired networks, for example, local area network (LAN), cable, etc., and wireless networks, such as Wireless LAN (WLAN), cellular, or satellite. For the purpose, the interface(s) 20 may include one or more ports for connecting the watermarking unit 14 to a number of terminals 12.

The drawing board 22 is a module in which the digital content may be digitally recreated and a watermark digitally overlaid.

The memory 24 may include any computer-readable medium known in the art including, for example, volatile memory such as static random access memory (SRAM) and dynamic random access memory (DRAM), and/or non-volatile memory, such as read only memory (ROM), erasable programmable ROM, flash memories, hard disks, optical disks, and magnetic tapes. The memory 24 may include routines, programs, objects, components, data structures, etc., which perform particular tasks or implement particular abstract data types. The memory 24 also stores data processed, received, and generated by one or more of the processors 18, interfaces 20, drawing board 22 or other sources.

Figure 2:
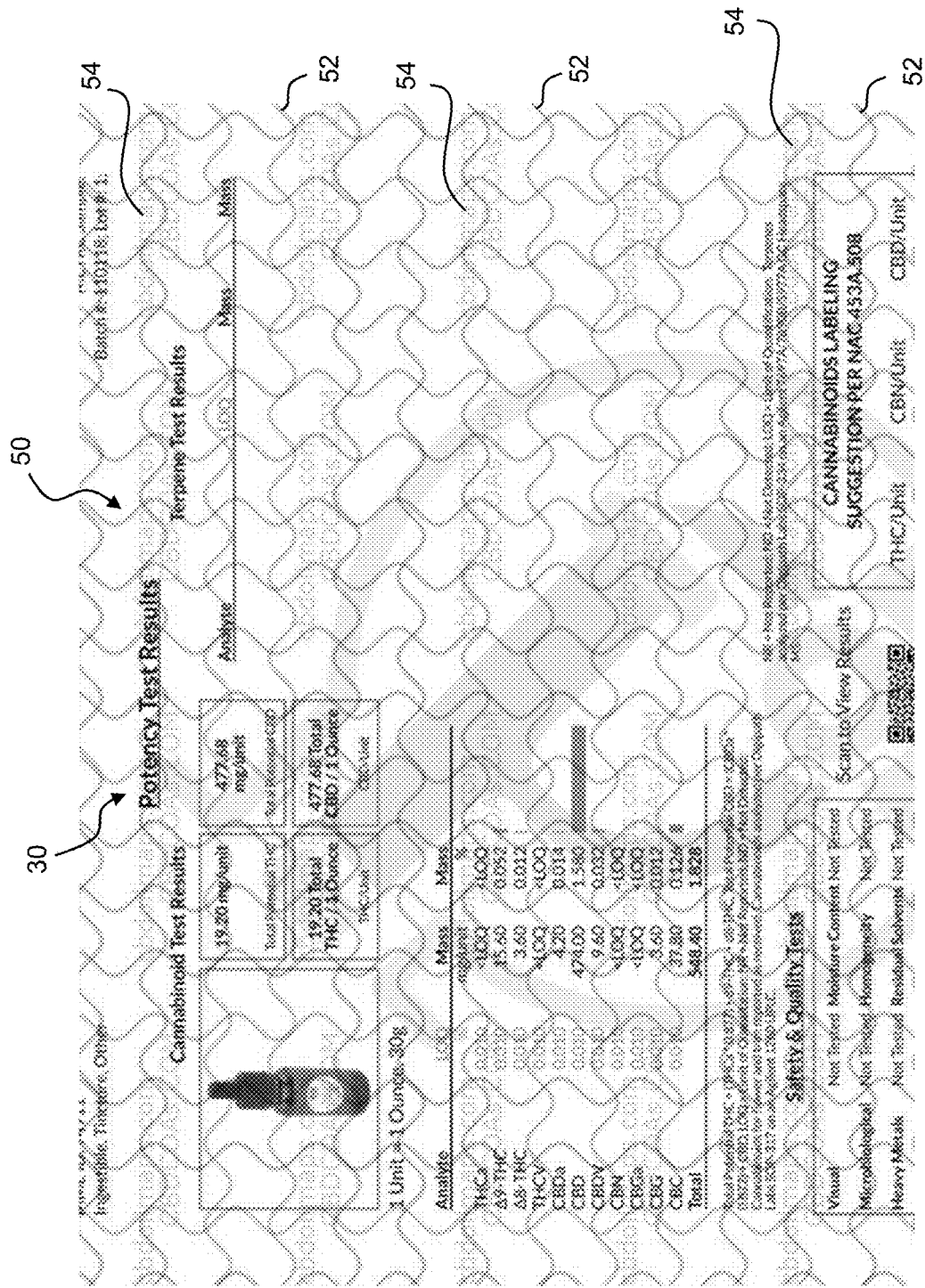
FIG. 2 is a drawing illustrating an exemplary watermark created by the watermarking system.

Referring to FIG. 2, exemplary digital content 30, in the illustrated case a product certificate, is shown with a watermark 50 generated by the watermarking unit 14 overlying the digital content 30. The watermark 50 includes a pattern of lines 52 and text 54 which overlap the digital content 30 and are visible both in the digital representation and any physical representation made thereof. Preferably, the watermark 50 extends over a substantial portion of the digital content 30, thereby making difficult for someone to try to modify the digital content 30 without disturbing the watermark 50. Additionally, the watermark 50 makes it difficult for the document to be converted into text form, for example, utilizing optical character recognition (OCR). To further increase the difficulty in modifying, converting or copying the digital content 30, each of the lines 52 preferably has a non-linear configuration between its ends and/or has a random opacity. Additionally, the spacing between the lines 52 may be random within a given watermark 50 or from watermark to watermark so that the specific pattern cannot be easily discerned. Similarly, the text 54 preferably has a random font size, a random opacity, random spacing and a random shadow. In a test of the disclosed system and method, professional "hackers" attempted for over 40 hours to remove the watermark 50 incorporating such features, or alternatively modify the digital content 30 without disturbing the watermark 50, and were unsuccessful.

Figure 3:
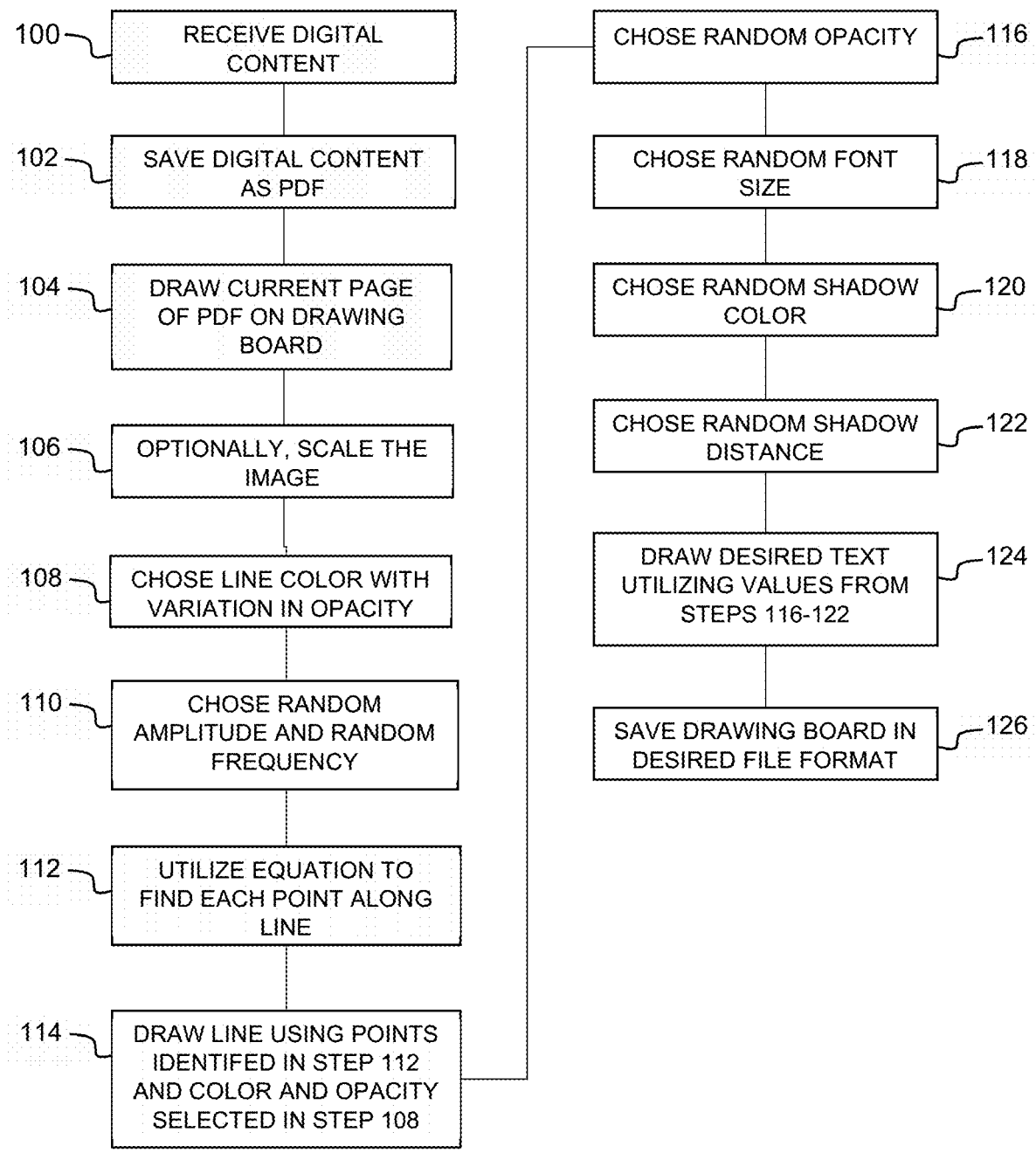
FIG. 3 is a flow diagram illustrating an exemplary method of creating a watermark in accordance with an embodiment of the disclosure.

For the sake of ease of explanation of the process of embedding and extracting the watermark, reference is made herein to the example process illustrated in FIG. 3. The example recited herein is intended expressly to be only for aiding the reader in understanding the principles of the invention and are not to be construed a limitation.

In step 100, the digital content 30 is received through one of the interfaces 20 and stored within the memory 24.

In step 102, the digital content 30 is saved as a pdf. If the original digital content is in pdf format, the digital content may be saved directly as a pdf. Alternatively, if not in pdf format, the digital content may be drawn or otherwise converted to pdf and saved.

For each page of the pdf, the following steps are to be completed:

In step 104, the current page of pdf is drawn onto a clear drawing board 24.

In optional step 106, the image may be scaled up to make it easier to read.

Steps 108-114 are repeated in a loop through x and y axes at desired increments, for example, at increments of 40-60 pixels each time for x and y axis, until the desired area of the drawing board 24 is overlaid with the lines 52.

In step 108, a line color is chosen with variation in opacity within a given range, for example, between 0.3-0.15.

In step 110, a random amplitude within a given range, for example between 13-8, and a frequency within a given range, for example between 11-9, are each chosen.

In step 112, the equation 'y+amplitude*sin((x+0)/frequency)' is utilized to find each point along the line.

In step 114, a line is drawn along the points identified in step 112 using the color and opacity selected in step 108.

Steps 116-124 are repeated in a loop through x and y axes at desired increments, for example, at increments of 250 pixels along the x axis and 125 pixels along they axis, until the desired area of the drawing board 24 is overlaid with the text 54.

In step 116, a random opacity is chosen within a given range, for example, between 0.15-0.09.

In step 118, a random font size is chosen within a given range, for example, between 22-18.

In step 120, a random color for shadow is chosen with the color being a random combination of the following values: Red: 255-0; Green: 255-0; Blue: 255-0.

In step 122, a random shadow distance is chosen within a given range, for example between 0 to $1e^{-16}$.

In step 124, a desired series of letters, for example the merchant's website name, is drawn using the selected values from steps 116-122.

In step 126, the content of the drawing board 24, with the digital content 30 and the watermark 50, is saved as a pdf.

The above steps are utilized to obtain the watermark 50 illustrated in FIG. 3. It is recognized that the steps may be varied to achieve different patterns and appearances. For example, the lines 52 may be formed as a series of non-linear vertical lines and a series of non-linear horizontal lines. In such case, the steps may be altered such that each vertical line is drawn by only changing the y coordinate and each horizontal line is drawn by only changing the x coordinate. In such example, each horizontal line would be drawn using the formula (amplitude*sin(x/frequency)) and each vertical line may be drawn using the formula (amplitude*cos(y/frequency)). It is further recognized that other line patterns may be chosen. Additionally, the lines 52 may provide a sufficient watermark that the text 54 may be omitted. In each case, the complexity of the lines 52 and text 54, in terms of pattern, spacing, size, color and opacity, creates a visible watermark 50 which prevents digital or physical modification of the digital content 30 without creating a noticeable change in the watermark 50.

These and other advantages of the present disclosure will be apparent to those skilled in the art from the foregoing specification. Accordingly, it will be recognized by those skilled in the art that changes or modifications may be made to the above-described embodiments without departing from the broad inventive concepts of the disclosure. It should therefore be understood that this disclosure is not limited to the particular embodiments described herein, but is intended to include all changes and modifications that are within the scope and spirit of the disclosure as defined in the claims.

What is claimed is:

1. A non-transitory computer readable storage medium including executable instructions that, when executed by a processor, cause the processor to: receive digital content; draw the digital content onto a drawing board; draw a visible watermark on the drawing board over the digital content, the visible watermark comprising a series of non-linear lines with the lines having random spacing therebetween in the x and y axes, and save the content of the drawing board in a desired file format.

2. The non-transitory computer readable storage medium of claim 1 wherein at least two of the lines have differing opacities.

3. The non-transitory computer readable storage medium of claim 1 wherein a first subset of the lines extend along the x axis and a second subset of lines extend along the y axis, wherein the first subset of lines have a different opacity than the second subset of lines.

4. The non-transitory computer readable storage medium of claim 3 wherein the lines within the first subset of lines are randomly spaced from one another and the lines within the second subset of lines are randomly spaced from one another.

5. The non-transitory computer readable storage medium of claim 1 wherein each of the lines extends generally non-parallel to both the x and y axes.

6. The non-transitory computer readable storage medium of claim 1 wherein the visible watermark further includes a plurality of textual elements.

7. The non-transitory computer readable storage medium of claim 6 wherein the textual elements are randomly spaced from one another in the x and/or y axis.

8. The non-transitory computer readable storage medium of claim 6 wherein the each of the textual elements has a random opacity chosen from a given range.

9. The non-transitory computer readable storage medium of claim 6 wherein the each of the textual elements has a random font size chosen from a given range.

10. The non-transitory computer readable storage medium of claim 6 wherein the each of the textual elements has a randomly generated shadow color.

11. A computer implemented method of processing digital content, the computer implemented method comprising:
    receiving digital content;
    drawing the digital content onto a drawing board;
    drawing a visible watermark on the drawing board over the digital content, the visible watermark comprising a series of non-linear lines with the lines having random spacing therebetween in the x and y axes, and
    saving the content of the drawing board in a desired file format.

12. The method of claim 11 wherein at least two of the lines have differing opacities.

13. The method of claim 11 wherein a first subset of the lines extend along the x axis and a second subset of lines extend along they axis, wherein the first subset of lines have a different opacity than the second subset of lines.

14. The method of claim 13 wherein the lines within the first subset of lines are randomly spaced from one another and the lines within the second subset of lines are randomly spaced from one another.

15. The method of claim 11 wherein each of the lines extends generally non-parallel to both the x and y axes.

16. The method of claim 11 wherein the visible watermark further includes a plurality of textual elements.

17. The method of claim 16 wherein the textual elements are randomly spaced from one another in the x and/or y axis.

18. The method of claim 16 wherein the each of the textual elements has a random opacity chosen from a given range.

19. The method of claim 16 wherein the each of the textual elements has a random font size chosen from a given range.

20. The method of claim 16 wherein the each of the textual elements has a randomly generated shadow color.

\* \* \* \* \*